United States Patent [19]

Barajas et al.

[11] Patent Number: 4,661,173

[45] Date of Patent: Apr. 28, 1987

[54] ALLOY-ENRICHED SOLDER CREAM

[75] Inventors: Felix Barajas, Huntington Beach; Donald W. Bridges, Irvine, both of Calif.

[73] Assignee: McDonnell Douglas Corporation, Long Beach, Calif.

[21] Appl. No.: 889,200

[22] Filed: Jul. 25, 1986

[51] Int. Cl.$^4$ .............................................. B23K 35/24
[52] U.S. Cl. ......................................... 148/24; 148/26
[58] Field of Search ..................................... 148/23-25

[56] References Cited

U.S. PATENT DOCUMENTS 3,684,533  8/1972  Conwicke ............................. 148/24
3,712,550  10/1975  Bolte ..................................... 148/25

Primary Examiner—Peter D. Rosenberg
Attorney, Agent, or Firm—Max Geldin

[57] ABSTRACT

A soldering composition containing at least 85% and less than 90% by weight of finely divided solder metal and a minor portion of a vehicle for the solder metal, consisting essentially of a rosin-type flux, a thickening agent and a minor portion, about 2 to about 7%, of a fluorinated tertiary alkylamine, particularly a perfluorotrihexyl amine. During vapor-phase soldering, the amine component is washed from the solder composition, leaving solder metal, rosin-type flux and thickening agent, in the remaining composition, the composition at this stage containing about 90% solder metal, and yielding dense solder joints, essentially no solder balls, and minimal residue.

21 Claims, No Drawings

4,661,173

ALLOY-ENRICHED SOLDER CREAM

BACKGROUND OF THE INVENTION

This invention relates to novel solder compositions or solder creams and is particularly concerned with the provision of solder compositions especially adapted for soldering components in densely packed microelectronic circuits and providing dense solder joints, no solder balls and substantially reduced residue.

A solder cream is a material that is capable of being applied to a substrate or surface in a specific pattern using screening or analogous methods which can subsequently undergo fusing to provide an electrical joint or interface commonly described as a solder joint. The solder cream generally consists of metallic particles of various alloys, such as tin-lead, tin-lead-silver, etc., contained in a vehicle including a flux, such as wood rosin or derivatives thereof.

Currently, microelectronic circuits are made by surface-mounting chip carriers and other components on ceramic and plastic substrates by vapor phase soldering. Circuits similar to those used on printed circuit boards are produced on the substrates. In certain instances, the circuit is located on one side of the substrate, with pads being provided in certain areas, other parts of the circuit being covered with an insulating material.

The solder cream having a paste-like consistency is applied, for example by means of a silk screen, to the pads on the circuit board. Thereafter, the electronic components are carefully positioned with their peripheral contacts on the solder cream-coated pads. When all of the components are thus in place, the board, with such components temporarily positioned and retained thereon by the solder cream, can be placed in a vapor reflow system and subjected to vapor-phase condensation soldering at a sufficiently high temperature to cause the metal content of the solder cream to liquefy and the contacts of the electronic components to be fused and to adhere to the pads on the circuit board. Examples of solder compositions are described in U.S. Pat. No. 3,684,533 to Conwicke and U.S. Pat. Nos. 4,373,974, 4,509,994 and 4,531,986, to Barajas.

In the solder compositions of the above patents, as previously noted, the vehicle for the solder cream generally contains a rosin-type or rosin-base flux. Recent articles by well-known experts, e.g., M. A. Stein, et al, in the November, 1985 issue of "Circuit Manufacturing", point out the advantages of dense solder creams, i.e., an alloy-rich mixture of solder alloy powder and rosin-base flux. Tests conducted by Stein, et al, indicate that a 90% alloy solder cream produces superior solder joints and essentially no solder balls, whereas an 85% alloy cream yields more porous solder joints encircled by halos of minute solder balls which require careful cleaning. The 90% alloy solder cream, however, is too viscous to screen fine lines and is too dry to firmly attach surface-mounted components.

It is accordingly an object of the present invention to provide an improved alloy-enriched solder composition which is especially adapted for soldering components in electronic circuits, particularly densely packed microelectronic circuits.

Another object is the provision of a solder composition of the above type containing a rosin-base flux which forms dense solder joints and without yielding solder balls.

A still further object of the invention is to provide an efficient solder composition of the above type which forms minimal residue.

SUMMARY OF THE INVENTION

It has now been found that the above objects and advantages can be achieved according to the invention by the provision of a soldering composition or solder cream containing a major portion, i.e., at least 85% and less than 90% by weight of finely divided solder metal or solder alloy and a minor portion of a vehicle for the solder metal, such vehicle consisting essentially of a rosin-type flux, a thickening agent, and a fluorinated tertiary alkylamine, particularly a perfluorotrihexyl amine, which is semi-solid at room temperature. The solder cream preferably also includes an activator.

During vapor-phase condensation soldering, the fluorinated tertiary alkylamine is washed from the solder composition, leaving solder metal, rosin-type flux and thickening agent in the remaining composition. Such remaining solder composition comprises essentially about 90% of the solder metal or alloy, and the remaining vehicle components. Thus, before melting of the remaining solder composition occurs, the solder cream is converted to a preform comprising about 90% solder alloy and about 10% vehicle containing rosin-type flux, the composition found superior by Stein, et al, noted above.

Thus, the invention composition, employing a combination of rosin-type flux and fluorinated tertiary alkylamine in the vehicle for the solder metal, together with a thickening agent, affords a unique solder cream which has essentially the same viscosity and tackiness as conventional rosin-base solder creams and thus has excellent screening properties and firmly attaches surface-mounted electronic components. During vapor-phase condensation soldering, the invention solder cream undergoes consolidation to form an alloy-enriched cream which yields dense solder joints, essentially no solder balls, and markedly less residue. Only minimal cleaning of the solder joints is thereafter required. Further, a substantial portion of the fluorinated amine component employed in the vehicle of the solder composition of the invention can be reclaimed for reuse following vapor phase soldering.

DETAILED DESCRIPTION OF THE INVENTION AND PREFERRED EMBODIMENTS

The vehicle for the solder metals of the solder composition of the invention is a liquid composition having desirable viscosity characteristics and which maintains the solder metals in suspension without settling of the fine solder particles. Such vehicle includes, in addition to a rosin-type flux and a fluorinated tertiary alkylamine, other components, such as viscosity controlling agents, organic solvents, and activator components.

An essential component of the vehicle is a flux. A suitable flux is a rosin-type or rosin-base flux, that is, rosin or derivatives thereof. Rosin, the non-steam volatile fraction of pine oleo-resin, is a mixture of five isomeric diterpene acids, the most abundant component being abietic acid. The terminology "rosin and derivatives thereof" includes rosin derived from gum, wood or tall oil, the acids in rosin, such as abietic acid and any of their derivatives, such as "Staybelite", "Poly-Pale", "Dimerex", "Vinsol", etc.

The second essential component of the vehicle is a fluorinated tertiary alkylamine, a compound which is semi-solid at room temperature. A particularly advantageous amine for this purpose is a perfluorotrihexyl amine.

The fluorinated tertiary alkylamine is preferably a perfluorinated trialkyl amine containing from 4 to 8 carbon atoms. Most desirably, the material employed is a perfluorotrihexyl amine, marketed as FC71 by 3M Co. This material is understood to comprise the straight chain and branched chain isomers, and also mixtures thereof. This material has a boiling range of about 250° to about 255° C., e.g., about 253° C. While being semi-solid at about room temperature, the FC71 commences to turn liquid at a slightly elevated temperature of about 25° to about 30° C. This component in conjunction with the thickening agent, confers a creamy consistency on the composition at room temperature.

Solder compositions containing the above fluorinated tertiary alkylamine as the essential vehicle component are disclosed in U.S. application Ser. No. 821,231, filed Jan. 22, 1986, titled "Rosin-Free Solder Composition" by F. Barajas and D. W. Bridges, and assigned to the same assignee as the present application, and is incorporated herein by reference.

There is also incorporated in the vehicle a compound which increases the viscosity of the vehicle to the desired consistency, such as a thickening or thixotropic agent, to impart creaminess to the solder cream, and which can also function as a suspension medium to prevent settling of the solder particles. Any suitable thickening or thixotropic agent can be used, provided that it does not leave a residue insoluble in organic solvents (e.g., trichloroethylene) on the solder metal, after the firing operation. Common thixotropic agents are disclosed by Erich, "Rheology", Academic Press, New York, 1967, Vol. 4, page 457. A preferred thixotropic agent is castor oil or hydrogenated castor oil (Baker Castor Oil Co. "Thixatrol"). Ethylene glycol monobutyl ether (butyl cellosolve) or carboxy methyl cellulose also can be used. A combination of such thickening agents can also be employed.

An additional optional componeht of the vehicle can be an organic solvent which aids in providing the proper consistency for the vehicle. Any of the common organic solvents, preferably non-chlorinated, may be used for this purpose, such as aliphatic alcohols, e.g., isopropyl alcohol, ketones, e.g., acetone, methyl ethyl ketone, methyl isobutyl ketone, and the like, esters such as alkyl acetates, mineral spirits, the terpenes (e.g., beta-terpineol), ethylene glycol, glycerol, aromatic hydrocarbons, such as benzene, toluene, xylene, and phenol, and mixtures thereof. Solvents, such as 2-butoxy (ethyl) ethyl acetate, 2-butoxy ethyl acetate, ethylene glycol or beta-terpineol, can also be used.

There is also preferably included in the vehicle a small amount of an organic brominated activator compound, which functions to react with and reduce any lead oxide and tin oxide in the solder metal powder during vapor phase soldering and convert such oxides to the corresponding bromides, which can be washed away from the solder joint to prevent contamination thereof. Thus, an organic bromide, such as bromocyclohexane or bromocamphor, can be employed for this purpose. A small amount of a surfactant, such as a nonionic fluorinated alkylester, e.g., the material marketed as FC-430 or FC-431 by 3M Co., can be employed in the solder composition as a scavenging aqent to take up and wash away such lead and tin bromides.

Other optional components, such as amine hydrochlorides, e.g., propylamine hydrochloride, hydroxyl substituted aliphatic amines, and aliphatic amines, such as isopropyl amine, can be present.

The solder compositions of the invention contain finely divided solder metals, in the form of metallic balls or particles, dispersed in the vehicle. The solder metals can be any of the conventional single or multiphase metals normally used for soldering, particularly tin, lead and silver, and alloys and mixtures thereof. Alloys or mixtures of tin-lead, tin-lead-silver, tin-silver, lead-silver, and lead-tin, for example, can be employed. A preferred mixture of solder metals employed in the solder composition of the invention consists essentially of a mixture of lead, tin and silver, which can contain from 61.5 to 62.5% tin, 1.75 to 2.25% silver, and the balance lead. A particularly preferred solder metal mixture consists of 36% lead, 62% tin and 2% silver. Another preferred solder metal consists of 37% lead and 63% tin. The solder metal should be finely divided, preferably having a particle size ranging from about 0.5 to about 100 microns, e.g., about 0.5 to about 70 microns, in diameter.

The solder compositions of the invention are prepared by admixing the solder metal of the desired particle size, and the vehicle in certain proportions, as noted below. In preferred practice, there is employed about 85 to about 88% of solder metal or alloy and about 12 to about 15% of total vehicle, by weight, most desirably 86 to 87% of solder metal and 13 to 14% of vehicle, by weight.

The fluorinated tertiary alkylamine component, e.g., perfluorotrihexyl amine, of the vehicle can be present in a range of about 2 to about 7%, e.g., about 4.5%, by weight, of the solder composition. The amount of fluorinated amine component employed should be such as to provide the same viscosity and tackiness, in conjunction with the other components of the vehicle, including rosin-type flux and thickening agent, as conventional solder compositions. The total amount of other components in the vehicle, including rosin-type flux and thickening agent, employed in conjunction with solder metal, is such that after the fluorinated amine is washed from the solder cream during vapor-phase soldering, the remaining solder composition contains about 90% of solder metal, the remainder being vehicle components including the rosin flux component and thickening agent. Thus, there can be employed for this purpose a total of about 5 to about 13%, e.g., about 9%, of other vehicle components, by weight of the initial composition.

The vehicle of the solder composition of the invention, excluding the fluorinated amine component, can contain about 2 to about 65%, e.g., about 30 to 60%, of rosin-type flux, by weight of such vehicle, about 0.5 to 10% by weight of a thickening agent, and about 30 to about 60% of an organic solvent.

The above activator compound, preferably employed, can be present in an amount of about 0.1 to about 1%, by weight of the total solder composition.

The solder compositions of the invention are prepared by admixing the solder metal and the vehicle, including rosin-type flux, thickener, activator and other optional components, together in the ranges and amounts noted above.

Thus, for example, a so-called dry box can be employed in which is deposited a quantity of the vehicle, according to the invention. The metallic component of the solder cream can be in the form of a wire or bar dispensed from a supply into a melting pot or crucible from which molten metal alloy flows through a bottom orifice into a stream of nitrogen gas and is reduced to small spherical particles ranging in diameter from about 0.5 to about 100 microns. The desired size metallic particles are then dispensed in the vehicle, in the desired proportions, and are mixed with the vehicle by means of a suitable mixer apparatus.

While the above illustrates one method of forming and combining the desired metallic particles with the vehicle to produce the solder cream, in practice, other similar methods may be used. This operation preferably is carried out within an inert atmosphere, e.g., nitrogen or the like, substantially to aid in minimizing oxidation of the metallic particles and to produce a solder cream substantially free of oxides which tend to inhibit attachment to the contacts of the chip carriers and the pads on the circuit boards, and to eliminate contaminated solder joints.

The solder compositions of the invention can be employed for soldering components, such as capacitors, resistors, integrated circuits and their packages or carriers, transistors, diodes, etc., onto a circuit, carried on a substrate. The solder compositions hereof are particularly applicable for use as microelectronic-grade solder creams, especially in the provision of densely packed microelectronic circuits.

The solder composition of the invention can be applied to any suitable substrate, such as small metal pads on a circuit board to which contacts of electronic components are to be soldered. Such application of the solder composition or solder cream can be made by use of metal screening to apply the solder cream to the pads. However, other modes of applying the solder cream in addition to screen printing can be employed, including, for example, dipping the objects to be soldered into the solder composition or employing syringe techniques.

Thereafter, the solder is heated to a temperature at which the solder becomes molten, and a highly adherent fused solder bond is formed. For this purpose, vapor-phase soldering is a preferred method, although other methods of heating the solder, such as the use of belt furnaces and infra-red heating, can be employed. Any atmosphere for heating can be used, e.g., air or an inert atmosphere employing an inert gas, such as nitrogen.

The following table shows examples of soldering compositions according to the invention.

TABLE

| COMPOSITIONS | A | B | C |
|---|---|---|---|
| Vehicle | | | |
| (wt % of total comp.) | 8.5 | 9.0 | 8.3 |
| Abietic acid | 60 | 59 | 50 |
| Castor oil | 8 | 8 | 10 |
| 2-butoxy (ethyl) ethyl acetate | 30 | 31 | |
| Isopropyl alcohol | 2 | | 40 |
| Isopropyl amine | | 2 | |
| FC71 | | | |
| (wt % of total comp.) | 4.5 | 4.5 | 6.0 |
| Bromocyclohexane | 0.5 | | 0.7 |
| (wt % of total comp.) | | | |
| Solder Metal | | | |
| (40-70 micron) | 86.5 | 86.5 | 85 |
| Lead | 36 | 37 | 36 |
| Tin | 62 | 63 | 62 |
| Silver | 2 | | 2 |

The following are specific examples of practice of the invention.

EXAMPLE I

In producing solder composition or solder cream A of the above Table, a lead-tin-silver metallic mixture in the proportions of 36% lead, 62% tin and 2% silver is formed into a very finely divided powder, as described in detail above.

The metallic powder is blown into a chamber, the metal balls are screened so that the particle size thereof is between 40 and 70 microns, and the particles are then mixed with the vehicle and including the FC71 and brominated activator, such operations being carried out in an inert atmosphere, e.g., of nitrogen, to aid in substantially reducing oxidation of the metals. In this example, the vehicle and metal mixture are combined in a percentage of 13.5% of total vehicle components and 86.5% of the metallic mixture, by weight. The resulting composition has good tackiness.

The solder cream is used to secure densely packed miniature electronic components to a ceramic substrate. A printed circuit is produced on the substrate. The circuit is on one side of the substrate, with pads composed of platinum and gold being provided in certain areas, other parts of the circuit being covered with an insulating material.

The screen is placed over the circuit and the pads, and the above solder cream is readily screened onto the pads on the circuit board. Thereafter, electronic components, including capacitors and resistors, are carefully positioned with their peripheral contacts on the solder cream-coated pads.

The circuit board with the electronic components, temporarily positioned and retained thereon by the solder cream, is placed in a chamber of a vapor phase reflow system containing liquid perfluorotriamyl amine (FC70), marketed by 3M Co., in the bottom of the chamber. The FC70 liquid is then heated by suitable means, such as electric heating coils, to a temperature of 215° C., producing boiling and vaporization of the FC70, the vapors ascending into the upper portion of the chamber and heating the ceramic substrate and the solder cream thereon. This results first in the melting and liquefaction of the perfluorotrihexyl amine (FC71) vehicle of the solder cream, which drains off the ceramic substrate into the liquid FC70 in the bottom of the chamber, and dissolving in such liquid. This leaves only alloy powder and the remaining components of the vehicle, including the rosin-type flux (abietic acid), thickener components and brominated activator, and such resulting composition eventually melts (reflow) when the temperature of the composition has been raised to the melting point of the alloy. Thus, after the FC71 has been removed, and before melting occurs, the solder cream has been converted to a composition which now contains about 90% alloy powder and about 10% vehicle, including rosin-type flux and other components. Since the metal mixture or alloy employed in the solder cream has a melting range between 177° C.

and about 189° C., the system temperature melts the metallic particles in the solder cream, and the solder alloy particles coalesce to form a solder joint, fusing or adhering the contacts of the electronic components to the pads on the circuit board, leaving the components securely positioned in place and soldered to the pads on the board. The components of the vehicle essentially decompose at the melting temperature of the alloy powder, and most of the residue is washed from the board into the FC70 fluid.

Following the soldering operation, it is observed that dense solder joints are formed, and all of the contacts are securely soldered to the pads with no formation of solder balls, and the solder joints are clean with essentially no char or residue coating on the solder joints, electronic components or the circuits. Hence, no special cleaning of the circuit board is required following vapor phase soldering, to remove any such deleterious matter.

Any unreacted activator removed from the solder cream during vapor phase soldering and passing into the liquid FC70 is insoluble therein and settles in the bottom of the soldering system, together with small amounts of tin and lead bromides and oxides. Such insoluble matter is continuously removed from the machine by filtration. During operation, periodically a portion of the FC70 fluid is removed and subjected to distillation, to separate and recover the dissolved FC71 from the FC70.

EXAMPLE II

The vapor phase soldering procedure of Example I is followed by employing, respectively, solder compositions B and C of the above Table.

Substantially the same results are obtained, namely, effective soldering of the electronic components occured, with dense solder joints and no formation of solder balls or of vehicle residue on the solder joints, electronic components or circuits.

From the foregoing, it is seen that the invention provides a novel solder composition employing in the vehicle a combination of an organic fluorinated amine, particularly perfluorotrihexyl amine, and rosin-type flux, which results in clean dense solder joints following vapor phase soldering, with essentially no solder balls and no deposition of organic residues, and avoiding the necessity of removal of any such residues. The fluorinated amine component can be readily blended with pine rosin, thickening agent and particular solder alloys into a solder cream or paste which has good screening properties and permits stencilling intricate patterns on substrates to serve as solder pads. Moreover, the fluorinated amine vehicle of the solder cream of the invention is compatible with, and dissolves in, the perfluorotriamyl amine (FC70), a closely related fluorinated fluid, commonly used as the heating medium in soft-solder vapor phase soldering.

The solder composition of the invention is particularly effective for use in the manufacture of microelectronic circuits with densely packed surface-mounted components for high-speed computers.

While particular embodiments of the invention have been described for purposes of illustration, it will be understood that various changes and modifications within the spirit of the invention can be made, and the invention is not to be taken as limited except by the scope of the appended claims.

What is claimed is:

1. A solder composition especially adapted for soldering components in electronic circuits to form solder joints and essentially free of solder ball formation, which comprises at least 85% and less than 90% by weight of finely divided solder metal, and a minor portion of a vehicle for said solder metal consisting essentially of a rosin-type flux, a thickening agent and a fluorinated tertiary alkylamine which is semi-solid at room temperature, whereby during vapor-phase condensation soldering, said tertiary alkylamine is washed from the solder composition and the remaining solder composition comprises essentially about 90% of said solder metal and the remainder of the vehicle components.

2. The solder composition of claim 1, said fluorinated tertiary alkylamine being a perfluorinated trialkyl amine containing from 4 to 8 carbon atoms.

3. The solder composition of claim 2, said perfluorinated trialkyl amine being perfluorotrihexyl amine.

4. The solder composition of claim 3, said perfluorotrihexyl amine being selected from the group consisting of the straight chain and branched chain isomers, and mixtures thereof.

5. The solder composition of claim 1, including a small amount of an organic brominated activator compound sufficient to react at soldering temperature with any lead oxide or tin oxide present in the solder metal, to convert said oxides to the corresponding bromides.

6. The solder composition of claim 5, said brominated activator compound selected from the group consisting of bromocyclohexane and bromocamphor.

7. The solder composition of claim 6, said brominated activator compound being present in an amount of about 0.1 to about 1% by weight of the composition.

8. The solder composition of claim 7, including a small amount of surfactant as scavenging agent for said bromides.

9. The solder composition of claim 1, said rosin-type flux comprising rosin and derivatives thereof.

10. The solder composition of claim 9, said rosin-type flux comprising abietic acid.

11. The solder composition of claim 9, said thickening agent being a thixotropic agent.

12. The solder composition of claim 11, said vehicle also containing an organic solvent.

13. The solder composition of claim 12, said vehicle, excluding said fluorinated amine, containing 0.5 to 10% of said thixotropic agent, 30 to 60% of said organic solvent and 2 to 65% of said flux, by weight of said vehicle.

14. The solder composition of claim 1, said solder metal being selected from the group consisting of tin, lead and silver, and alloys and mixtures thereof.

15. The solder composition of claim 14, the particle size of said solder metal ranging from about 0.5 to about 100 microns.

16. A solder composition especially adapted for soldering components in electronic circuits to form dense solder joints and essentially free of solder ball formation, and with minimal residue, which comprises about 85 to about 88% of finely divided solder metal, a minor portion of a vehicle for said solder metal, said vehicle consisting essentially of a rosin-type flux, a thickening agent and about 2 to about 7% by weight of said composition of a perfluorotrihexyl amine which is semi-solid at room temperature and which in conjunction with said thickening agent, confers a creamy consistency on the composition at room temperature, whereby during vapor-phase condensation soldering, said amine is washed from the solder composition, and the remaining solder composition comprises essentially about 90% of said solder metal and the remainder of the vehicle components.

17. The solder composition of claim 16, including a small amount of an organic brominated activator compound sufficient to react at soldering temperature with any lead oxide or tin oxide present in the solder metal, to convert said oxides to the corresponding bromides.

18. The solder composition of claim 17, said brominated activator compound selected from the group consisting of bromocyclohexane and bromocamphor, said brominated activator compound being present in an amount of about 0.1 to about 1% by weight of the composition.

19. The solder composition of claim 18, said vehicle, excluding said fluorinated amine, containing 0.5 to 10% of said thickening agent, 30 to 60% of said organic solvent and 30 to 60% of said flux, by weight of said vehicle.

20. The solder composition of claim 19, said thickening agent being selected from the group consisting of castor oil and ethylene glycol monobutyl ether, and said rosin-type flux comprising abietic acid.

21. The solder composition of claim 20, said solvent being 2-butoxy (ethyl) ethyl acetate or isopropyl alcohol.

* * * * *